(12) United States Patent
Rodriguez Bravo et al.

(10) Patent No.: US 11,599,084 B2
(45) Date of Patent: Mar. 7, 2023

(54) EARLY NOTIFICATION SYSTEM OF DEGRADATION OF 3D PRINTED PARTS

(71) Applicant: Kyndryl, Inc., New York, NY (US)

(72) Inventors: Cesar Augusto Rodriguez Bravo, Alajuela (CR); Franz Friedrich Liebinger Portela, San Pablo de Heredia (CR); David Alonso Campos Batista, Aurora (CR); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/351,386

(22) Filed: Jun. 18, 2021

(65) Prior Publication Data
US 2022/0404795 A1 Dec. 22, 2022

(51) Int. Cl.
*G05B 19/4065* (2006.01)
*G05B 19/4099* (2006.01)

(52) U.S. Cl.
CPC ..... *G05B 19/4065* (2013.01); *G05B 19/4099* (2013.01); *G05B 2219/49023* (2013.01)

(58) Field of Classification Search
None
See application file for complete search history.

(56) References Cited

U.S. PATENT DOCUMENTS

| 9,001,121 | B2 * | 4/2015 | Finlayson | G06T 17/00 345/420 |
| 9,073,259 | B2 | 7/2015 | Dufort | |
| 9,656,422 | B2 | 5/2017 | Smoot | |
| 10,307,961 | B2 | 6/2019 | Rezayat | |
| 2008/0310754 | A1 * | 12/2008 | Safai | G01C 11/00 382/275 |
| 2009/0128557 | A1 * | 5/2009 | Finlayson | G06T 17/00 345/420 |
| 2011/0114839 | A1 * | 5/2011 | Stecker | B23K 15/0013 250/307 |

(Continued)

FOREIGN PATENT DOCUMENTS

| CN | 108422673 A | 8/2018 |
| CN | 105722663 B | 5/2019 |

(Continued)

OTHER PUBLICATIONS

Bundell, Shamini, "New 3D printer makes multi-material robots". Nature, ISSN 1476-4687 (Online), Nov. 13, 2019, 3 Pages.

(Continued)

*Primary Examiner* — Jason Lin
(74) *Attorney, Agent, or Firm* — John Kennel, Esq.; Kevin P. Radigan, Esq.; Heslin Rothenberg Farley & Mesiti P.C.

(57) ABSTRACT

In an approach for early notification of degradation of 3D printed parts, a processor completes an initial scan of a 3D printed part using backscatter techniques when the 3D printed part is installed and idle in the unit. A processor completes a second scan of the 3D printed part using backscatter techniques when the unit is in operation. A processor determines a baseline delta between the initial scan and the second scan. A processor performs an additional scan after a preset time interval of the 3D printed part using backscatter techniques in operation within the unit. A processor determines whether the additional scan is within the baseline delta.

17 Claims, 3 Drawing Sheets

(56) References Cited

U.S. PATENT DOCUMENTS

| | | | |
|---|---|---|---|
| 2015/0057784 A1 | 2/2015 | Butler | |
| 2015/0079327 A1 | 3/2015 | Kautz | |
| 2015/0197063 A1 | 7/2015 | Shinar | |
| 2016/0061991 A1* | 3/2016 | Berkcan | G01V 5/145 |
| | | | 250/269.2 |
| 2016/0279707 A1* | 9/2016 | Mattes | B29C 64/153 |
| 2018/0104742 A1* | 4/2018 | Kottilingam | B22F 10/20 |
| 2018/0126670 A1 | 5/2018 | Dehghanniri | |
| 2018/0143147 A1* | 5/2018 | Milner | B29C 64/153 |
| 2018/0193947 A1* | 7/2018 | Harding | B23K 26/342 |
| 2019/0143412 A1 | 5/2019 | Buller | |
| 2019/0193156 A1* | 6/2019 | Yang | G06T 7/0008 |
| 2021/0086441 A1* | 3/2021 | Georgeson | G06T 7/13 |

FOREIGN PATENT DOCUMENTS

| | | |
|---|---|---|
| EP | 3446862 A1 | 3/2020 |
| WO | 2019005708 A2 | 1/2019 |
| WO | 2019063094 A1 | 4/2019 |

OTHER PUBLICATIONS

Klomp, Sander, "Printing conductive and non-conductive materials simultaneously on low-end 3d printers", Master's Dissertation, Universiteit Gent, Deparlment of Industrial System and Product Design, Jun. 2015, 98 Pages.

Kuzmenko et al., "Tailor-made conductive inks from cellulose nanofibrils for 3D printing of neural guidelines", ScienceDirect, Carbohydrate Polymers, vol. 189, Jun. 1, 2018, 3 Pages. (Abstract Only).

Langston, Jennifer, "Interscatter communication enables first-ever implanted devices, smart contact lenses, credit cards that 'talk' Wi-Fi", UW News, University of Washington, Aug. 17, 2016, 6 Pages.

Langston, Jennifer, "In first, 3-D printed objects connect to WiFi without electronics", UW News, University of Washington, Dec. 5, 2017, 7 Pages.

* cited by examiner

EARLY NOTIFICATION SYSTEM OF DEGRADATION OF 3D PRINTED PARTS

BACKGROUND OF THE INVENTION

The present invention relates generally to the field of three-dimensional (3D) printing, and more particularly to an early notification system of degradation of 3D printed parts.

3D printing, or additive manufacturing, is the construction of a three-dimensional (3D) object from a computer-aided design (CAD) model, via a 3D scanner, or by a plain digital camera and photogrammetry software. The term "3D printing" can refer to a variety of processes in which material is deposited, joined, or solidified under computer control to create a three-dimensional object, with material being added together (such as plastics, liquids or powder grains being fused together), typically layer by layer.

SUMMARY

Aspects of an embodiment of the present invention disclose a method, computer program product, and computer system for early notification of degradation of 3D printed parts. A processor completes an initial scan of a 3D printed part using backscatter techniques when the 3D printed part is installed and idle in the unit. A processor completes a second scan of the 3D printed part using backscatter techniques when the unit is in operation. A processor determines a baseline delta between the initial scan and the second scan. A processor performs an additional scan after a preset time interval of the 3D printed part using backscatter techniques in operation within the unit. A processor determines whether the additional scan is within the baseline delta.

DETAILED DESCRIPTION

Embodiments of the present invention recognize that 3D printing has become a common practice in many industries, but the main issue holding some companies back from implementing this technology is the reliability of 3D printed parts. Most 3D printed parts do not pass an extensive stress test, so there is a high likelihood that the part will break or malfunction at some time potentially causing machine downtime, which can be costly for companies. Embodiments of the present invention recognize the need for self-monitoring capabilities by 3D printed parts, so that a 3D printed part can autonomously inform if there is any unexpected degradation of the part that may impact its functionality, efficiency, and longevity.

Embodiments of the present invention provide a system and method for analyzing the degradation of a 3D printed part to determine potential and upcoming errors or malfunctions and autonomously communicating the problem in real time without a power source. Embodiments of the present invention identify damage to certain 3D printed components in a system without the use of internal mechanisms. Embodiments of the present invention monitor for failure scenarios in a part or mechanism by using multiple frequencies to scan multiple parts simultaneously.

Embodiments of the present invention employ backscatter techniques to allow 3D printed parts to communicate with Wi-Fi® receivers autonomously. Backscatter is the reflection of waves, particles, or signals back to the direction from which they came. Thus, backscatter techniques are used herein to scan a 3D printed part before and during its operation in a system and identify degradation of the 3D printed part. For example, one backscatter technique uses an antenna to transmit data by reflecting radio signals emitted by a Wi-Fi® router or another device. Information embedded in the reflected radio signals can then be decoded by a Wi-Fi® receiver. The antenna is contained in a 3D printed object made of conductive printing filament that mixes plastic with copper. Embodiments of the present invention that utilize this technique must baseline the 3D printed part prior to setup to ensure that the backscatter reflection is absorbed by the amount of surface coating of nonconductive material.

Any change on the physical structure of the 3D printed object will expose part of the conductive material and case a conductive switch to intermittently connect or disconnect with the antenna and change its reflective state. The system will manage states one (1) and zero (0), and the states will switch based on the reflective state. A zero (0) state denotes no changes on the composition of the 3D printed object. A one (1) state denotes that conductive material has been exposed, i.e., a change to the surface of the 3D printed object.

In this system, a 3D printed object is printed using a multi-material print. The print has a metallic filament print engulfed between layers of non-metallic compound as known to a person of skill in the art. The metallic filaments reside engulfed in non-metallic casing, as the exposure of this metallic filament results in a positive antenna feedback, i.e., a one (1) state as described above. At least two layers of thickness is needed between metallic filaments to ensure they are properly isolated from each other and from an external wall of the object. All of these settings can be included in a 3D print data file. Once the 3D printed object is ready and has been inspected, the 3D printed object is placed into operation, and if it is a part of a larger machine or unit, the 3D printed object is placed in its designated position within the unit.

Embodiments of the present invention complete an initial scan (i.e., take a backscatter image) of the 3D printed object and/or the unit to identify the backscatter form (i.e., shape) of the unit. Embodiments of the present invention complete a second scan of the 3D printed object and/or the unit once the unit is placed into operation. The backscatter images are used to identify a baseline delta, i.e., acceptable noise ranges, between the two scans. Once the noise ranges have been identified, the unit is left in operation and the system performs scheduled pulses (i.e., scans) to take measurements of the backscatter from the unit.

The system evaluates the measurements by comparing a measurement to the baseline delta. If a measurement is within the operational backscatter baseline delta, as per the two-scan differential, then the measurement is noted, and operation continues uninterrupted and measurements are continued to be taken. If a measurement is outside the operational backscatter baseline delta, then the operation is slowed or stopped, depending on user settings, and an alarm is generated, which indicates the part has failed and may be introducing variance into the machine operation. The system can initiate a new 3D print of the part that failed as soon as the alarm is generated, so that the new 3D printed part can be ready to replace the failed part and repairs can be done quickly. If a repair is done, the system repeats the process starting with completing an initial scan of the new 3D printed object, completing a second scan, identifying a baseline delta, and performing scheduled pulses on the unit in operation to take measurements of the backscatter.

Implementation of embodiments of the invention may take a variety of forms, and exemplary implementation details are discussed subsequently with reference to the Figures.

Figure 1:
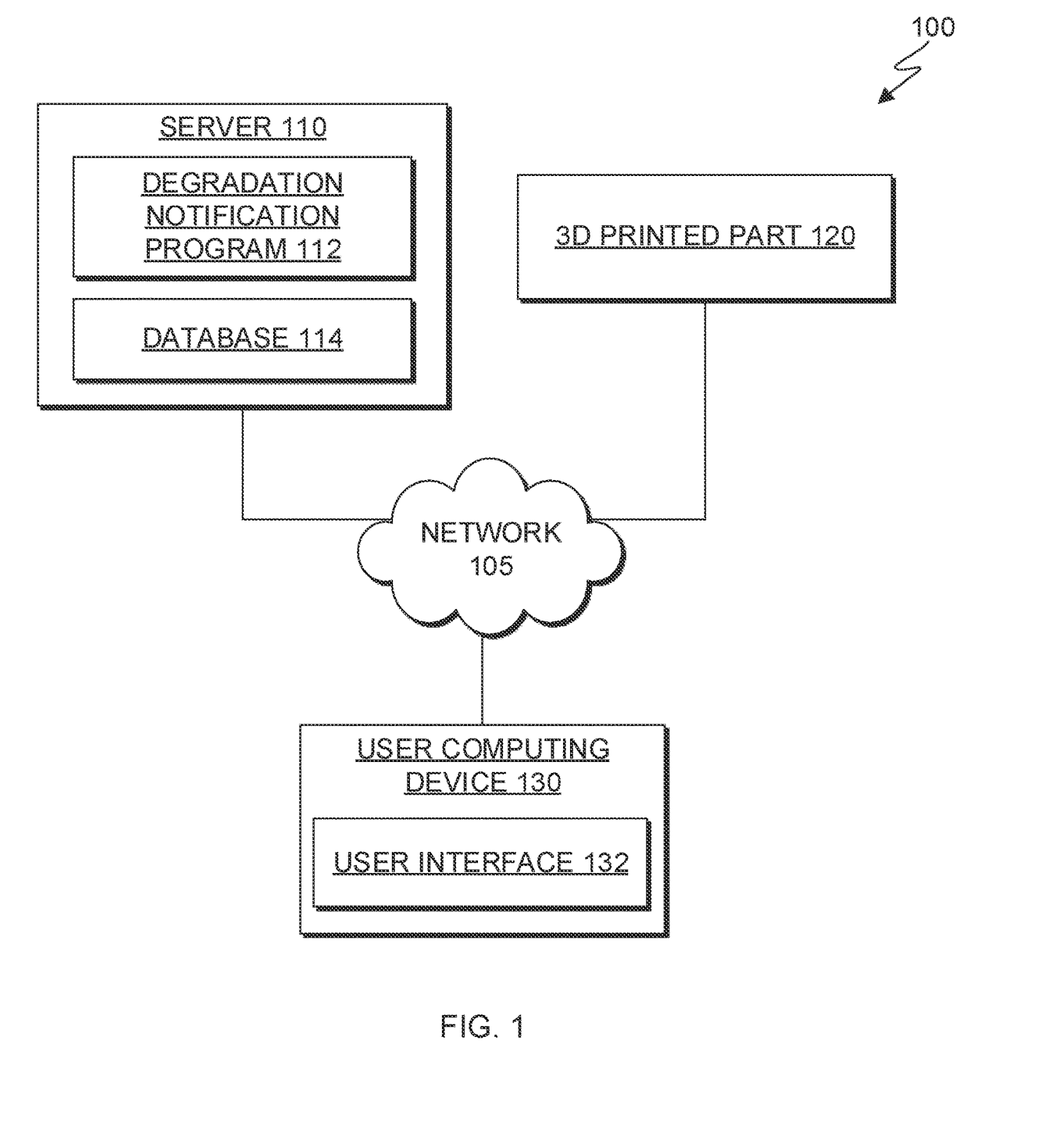
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. In an embodiment, distributed data processing environment 100 is a degradation notification system for early notification of degradation of 3D printed objects. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110, 3D printed part 120, and user computing device 130 interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, 3D printed part 120, user computing device 130, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with 3D printed part 120, user computing device 130, and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes 3D printed part degradation program 112 and database 114. Server 110 may include internal and external hardware components, as depicted, and described in further detail with respect to FIG. 3.

Degradation notification program 112 operates for early notification of degradation of 3D printed objects. In the depicted embodiment, degradation notification program 112 is a standalone program. In another embodiment, degradation notification program 112 may be integrated into another software product, such as a software package for a 3D printer. Degradation notification program 112 is depicted and described in further detail with respect to FIG. 2.

Database 114 operates as a repository for data received, used, and/or output by degradation notification program 112. Data received, used, and/or generated may include, but is not limited to, backscatter scans and a determined baseline delta; backscatter measurements; alarm settings; data input by users through user computing device 130; and any other data received, used, and/or output by degradation notification program 112. Database 114 can be implemented with any type of storage device capable of storing data and configuration files that can be accessed and utilized by server 110, such as a hard disk drive, a database server, or a flash memory. In an embodiment, database 114 is accessed by degradation notification program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that degradation notification program 112 has access to database 114.

The present invention may contain various accessible data sources, such as database 114, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Degradation notification program 112 enables the authorized and secure processing of personal data.

Degradation notification program 112 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Degradation notification program 112 provides information regarding personal and/or confidential company data and the nature (e.g., type, scope, purpose, duration, etc.) of the processing. Degradation notification program 112 provides the user with copies of stored personal and/or confidential company data. Degradation notification program 112 allows the correction or completion of incorrect or incomplete personal and/or confidential company data. Degradation notification program 112 allows for the immediate deletion of personal and/or confidential company data.

3D printed part 120 operates as a part or component of a unit (e.g., mechanical system) that has been 3D printed. The unit may comprise multiple 3D printed parts and the system herein can perform this process for any number of 3D printed parts.

User computing device 130 operates as a computing device associated with at least one user on which the user can interact with degradation notification program 112 through an application user interface. In an embodiment, user computing device 130 is associated with a user who has opted-in to degradation notification program 112, such as an operator of the unit. In the depicted embodiment, user computing device 130 includes an instance of user interface 132. In an embodiment, user computing device 130 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 130 represents one or more programmable electronic devices or combination of programmable electronic devices capable of executing machine readable program instructions and communicating with other computing devices (not shown) within distributed data processing environment 100 via a network, such as network 105. User computing device 130 may include internal and external hardware components, as depicted, and described in further detail with respect to FIG. 3.

User interface 132 provides an interface between degradation notification program 112 on server 110 and a user of user computing device 130. In one embodiment, user interface 132 is a mobile application software. Mobile application software, or an "app," is a computer program designed to run on smart phones, tablet computers, and other mobile computing devices. In one embodiment, user interface 132 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 132 enable users of user computing device 130 to opt-in to degradation notification program 112 and configure user settings. For example, degradation notification program 112 enables a user to configure alarm settings.

Figure 2:
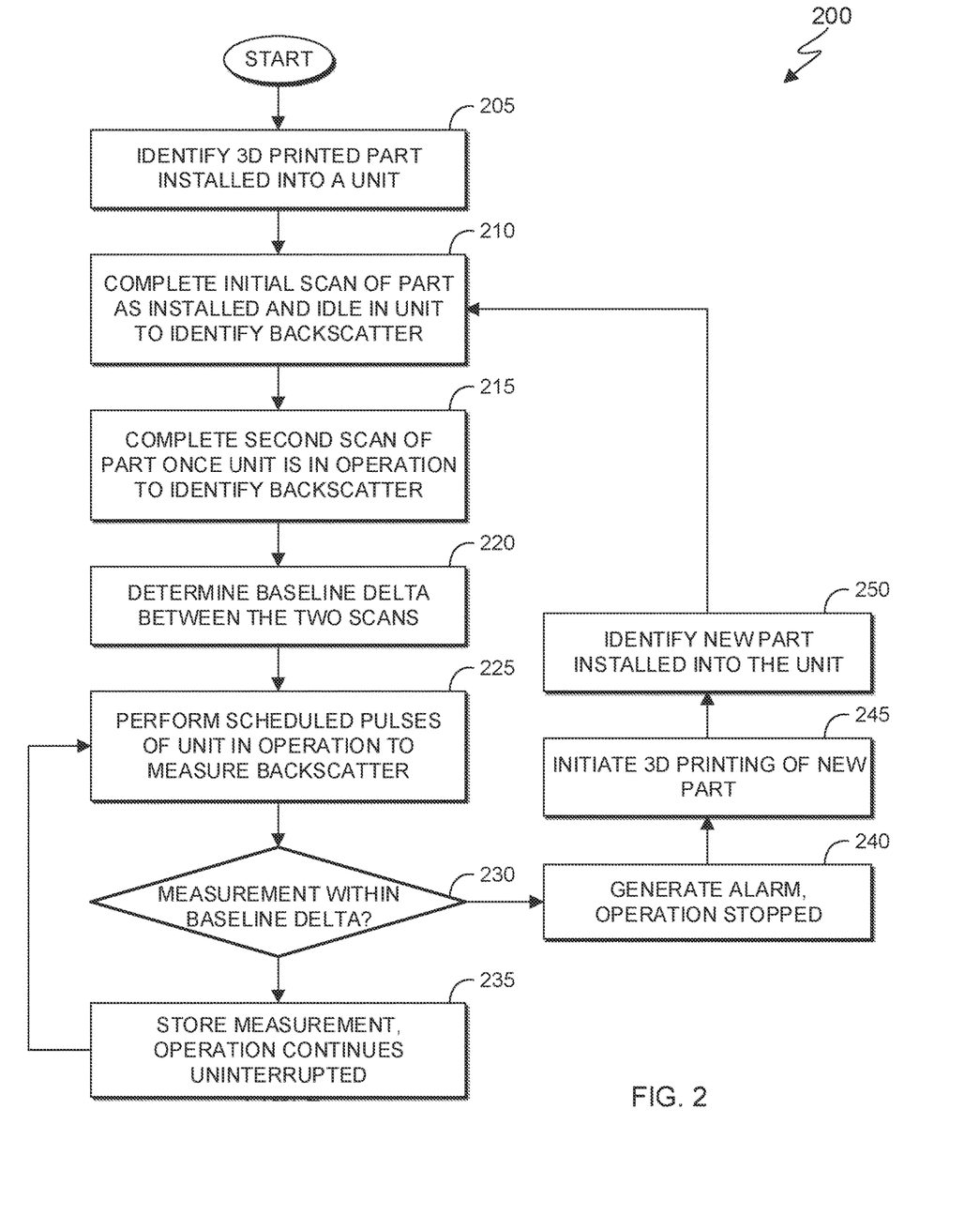
FIG. 2 is a flowchart depicting operational steps of a degradation notification program, for early notification of degradation of 3D printed objects, in accordance with an embodiment of the present invention.

FIG. 2 is a flowchart 200 depicting operational steps of degradation notification program 112, for early notification of degradation of 3D printed parts, in accordance with an embodiment of the present invention. It should be appreciated that the process depicted in FIG. 2 illustrates one possible iteration of degradation notification program 112.

In step 205, degradation notification program 112 identifies that a 3D printed part has been installed into a unit. In an embodiment, degradation notification program 112 identifies that a 3D printed part has been installed into a unit, i.e., placed into operation in a system, e.g., a mechanical unit. The 3D printed part is printed using a multi-material print. The print has a metallic filament print engulfed between layers of non-metallic compound as known to a person of skill in the art. The metallic filaments reside engulfed in non-metallic casing, as the exposure of this metallic filament results in a positive antenna feedback, i.e., a one (1) state as described above. At least two layers of thickness is needed between metallic filaments to ensure they are properly isolated from each other and from an external wall of the object. In an embodiment, degradation notification program 112 reviews a 3D print data file to ensure all of these settings are set and the 3D printed part is completed correctly.

Responsive to the 3D printed part being completed, inspected, and placed into operation, degradation notification program 112 identifies that the 3D printed part has been installed into a unit.

In step 210, degradation notification program 112 completes an initial scan of the 3D printed part as installed and while idle in the unit to identify backscatter. In an embodiment, degradation notification program 112 completes an initial scan (i.e., takes a backscatter image) of the 3D printed part to identify the backscatter form (i.e., shape) of the part as installed idle in the unit. In an embodiment, degradation notification program 112 utilize backscatter techniques over WiFi® or Bluetooth® or any other backscatter techniques available to complete the initial scan of the 3D printed part.

In step 215, degradation notification program 112 completes a second scan of the 3D printed part once the unit is in operation to identify backscatter. In an embodiment, degradation notification program 112 completes a second scan (i.e., takes a backscatter image) of the 3D printed part (or the part within the unit) to identify the backscatter form (i.e., shape) once the unit is in operation. In an embodiment, degradation notification program 112 utilize backscatter techniques over WiFi® or Bluetooth® or any other backscatter techniques available to complete the second scan of the 3D printed part.

In step 220, degradation notification program 112 determines a baseline delta for backscatter between the two scans. In an embodiment, degradation notification program 112 determines a baseline delta for backscatter using the initial scan and the second scan of the 3D printed part within the unit, i.e., an acceptable noise range between the two scans or a differential value range between the two scans. After some time, if the 3D printed part shows some tear and wear, the metallic filaments of the 3D printed part will be exposed causing a different reading in contrast with the baseline. Therefore, this baseline delta between backscatter readings is what degradation notification program 112 uses to determine that there is some defects caused by time, wear, and tear on the 3D printed part.

In step 225, degradation notification program 112 performs scheduled pulses of the unit in operation to measure backscatter. In an embodiment, degradation notification program 112 performs scheduled pulses (i.e., preset scans) of the 3D printed part in operation within the unit. In an embodiment, degradation notification program 112 performs the scans using the same backscatter techniques to identify any deltas (i.e., changes) which may indicate a defect in the 3D printed part.

In decision 230, degradation notification program 112 determines whether a measurement taken is within the baseline delta. In an embodiment, degradation notification program 112 determines whether a measurement taken is within the baseline delta by comparing the measurement to the baseline delta.

If degradation notification program 112 determines the measurement taken is within the baseline delta, degradation notification program 112 proceed to step 235, in which degradation notification program 112 stores the measurement, allows operation to continue uninterrupted, and continues to perform scheduled pulses (returning to step 225).

If degradation notification program 112 determines the measurement taken is not within the baseline delta, degradation notification program 112 proceeds to step 240, in which degradation notification program 112 (1) generates an alarm to notify a user that the 3D printed part has failed and may be introducing variance into the operation and (2) slows or stops the operation of the unit, depending on user settings.

In an embodiment, degradation notification program 112 outputs an alarm to a user through a user interface of a user computing device notifying the user that the 3D printed part has failed in some way.

In step 245, degradation notification program 112 initiates 3D printing of a new part to replace the failed 3D printed part. In an embodiment, responsive to generating the alarm, degradation notification program 112 initiates 3D printing of a new part to replace the failed 3D printed part. This ensure a new 3D printed part is ready as soon as possible and repairs can be done quickly.

In step 250, degradation notification program 112 identifies the new part has been installed in the unit and returns to step 210 to complete an initial scan of the new part and proceed through the steps again, as necessary.

Figure 3:
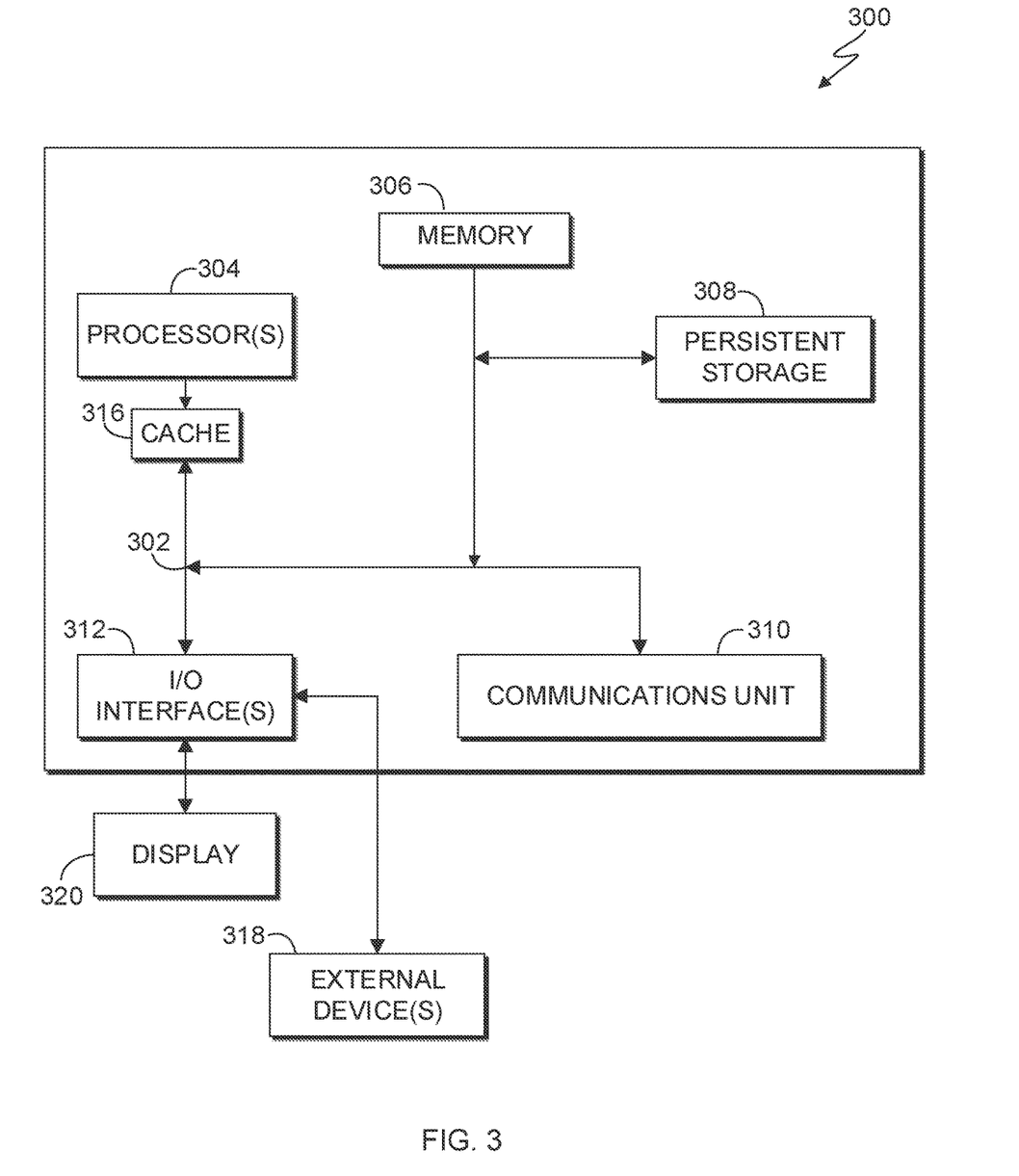
FIG. 3 depicts a block diagram of components of a computing device of the distributed data processing environment of FIG. 1, in accordance with an embodiment of the present invention.

FIG. 3 depicts a block diagram of components of computing device 300, suitable for server 110 and/or user computing device 130 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110 and/or user computing device 130. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for early notification of degradation of three dimensional (3D) printed parts, the computer-implemented method comprising:
   completing, by one or more processors, an initial scan of a 3D printed part using backscatter techniques at a first time interval, wherein the 3D printed part is installed and idle in a unit at the first time interval;
   completing, by the one or more processors, a second scan of the 3D printed part using the backscatter techniques at a second time interval, wherein the unit is in operation at the second time interval;
   determining, by the one or more processors, a baseline delta between the initial scan and the second scan;
   performing, by the one or more processors, an additional scan after a preset time interval of the 3D printed part using backscatter techniques in operation within the unit;
   determining, by the one or more processors, whether the additional scan is within the baseline delta; and
   determining the additional scan is within the baseline delta, and based on determining the additional scan is within the baseline delta:
      storing, by the one or more processors, the additional scan; and
      enabling, by the one or more processors, the operation to continue uninterrupted.

2. The computer-implemented method of claim 1, further comprising:
   identifying, by the one or more processors, that the 3D printed part has been installed into the unit, wherein the 3D printed part has a metallic filament engulfed between layers of non-metallic compound.

3. The computer-implemented method of claim 1, wherein the baseline delta represents an acceptable noise range in a form of a differential value range between the initial scan and the second scan.

4. The computer-implemented method of claim 1, further comprising:
  determining the additional scan is not within the baseline delta, and based on determining the additional scan is not within the baseline delta:
  generating, by the one or more processors, an alarm; and performing one of:
    stopping, by the one or more processors, the operation, or
    slowing, by the one or more processors, the operation.

5. The computer-implemented method of claim 4, further comprising:
  outputting, by the one or more processors, an alarm to a user through a user interface of a user computing device that the 3D printed part has failed.

6. The computer-implemented method of claim 4, further comprising:
  responsive to generating the alarm, initiating, by the one or more processors, printing of a new 3D printed part to replace the 3D printed part that failed; and
  identifying that the new 3D printed part has been installed in the unit, and based on identifying that the new 3D printed part has been installed in the unit:
    repeating the completing an initial scan; the completing a second scan; the determining a baseline delta; the performing the additional scan; and the determining whether the additional scan is within the baseline delta steps for the new 3D printed part.

7. A computer program product for early notification of degradation of three dimensional (3D) printed parts, the computer program product comprising:
  one or more computer readable storage media and program instructions collectively stored on the one or more computer readable storage media, the stored program instructions comprising:
    program instructions to complete an initial scan of a 3D printed part using backscatter techniques at a first time interval, wherein the 3D printed part is installed and idle in a unit at the first time interval;
    program instructions to complete a second scan of the 3D printed part using the backscatter techniques at a second time interval, wherein the unit is in operation at the second time interval;
    program instructions to determine a baseline delta between the initial scan and the second scan;
    program instructions to perform an additional scan after a preset time interval of the 3D printed part using backscatter techniques in operation within the unit;
    program instructions to determine whether the additional scan is within the baseline delta; and
    program instructions to determine the additional scan is within the baseline delta, and based on determining the additional scan is within the baseline delta to:
      store the additional scan; and
      enable the operation to continue uninterrupted.

8. The computer program product of claim 7, further comprising:
  program instructions to identify that the 3D printed part has been installed into the unit, wherein the 3D printed part has a metallic filament engulfed between layers of non-metallic compound.

9. The computer program product of claim 7, wherein the baseline delta represents an acceptable noise range in a form of a differential value range between the initial scan and the second scan.

10. The computer program product of claim 7, further comprising:
  determining the additional scan is not within the baseline delta, and based on determining the additional scan is not within the baseline delta:
    program instructions to generate an alarm; and
    program instructions to stop the operation or slow the operation.

11. The computer program product of claim 10, further comprising:
  program instructions to output an alarm to a user through a user interface of a user computing device that the 3D printed part has failed.

12. The computer program product of claim 10, further comprising:
  responsive to generating the alarm, program instructions to initiate printing of a new 3D printed part to replace the 3D printed part that failed; and
  identifying that the new 3D printed part has been installed in the unit, and based on identifying that the new 3D printed part has been installed in the unit:
    program instructions to repeat the program instructions to complete an initial scan; the program instructions to complete a second scan; the program instructions to determine a baseline delta; the program instructions to perform the additional scan; and the program instructions to determine whether the additional scan is within the baseline delta steps for the new 3D printed part.

13. A computer system for early notification of degradation of three dimensional (3D) printed parts, the computer system comprising:
  one or more computer processors;
  one or more computer readable storage media;
  program instructions collectively stored on the one or more computer readable storage media for execution by at least one of the one or more computer processors, the stored program instructions comprising:
    program instructions to complete an initial scan of a 3D printed part using backscatter techniques at a first time interval, wherein the 3D printed part is installed and idle in a unit at the first time interval;
    program instructions to complete a second scan of the 3D printed part using the backscatter techniques at a second time interval, wherein the unit is in operation at the second time interval;
    program instructions to determine a baseline delta between the initial scan and the second scan;
    program instructions to perform an additional scan after a preset time interval of the 3D printed part using backscatter techniques in operation within the unit;
    program instructions to determine whether the additional scan is within the baseline delta; and
    program instructions to determine the additional scan is within the baseline delta, and based on determining the additional scan is within the baseline delta to:
      store the additional scan; and
      enable the operation to continue uninterrupted.

14. The computer system of claim 13, further comprising:
  program instructions to identify that the 3D printed part has been installed into the unit, wherein the 3D printed part has a metallic filament engulfed between layers of non-metallic compound.

15. The computer system of claim 13, wherein the baseline delta represents an acceptable noise range in a form of a differential value range between the initial scan and the second scan.

16. The computer system of claim 13, further comprising:
responsive to determining the additional scan is not within the baseline delta,
program instructions to generate an alarm; and
program instructions to stop the operation or slow the operation.

17. The computer system of claim 16, further comprising:
responsive to generating the alarm, program instructions to initiate printing of a new 3D printed part to replace the 3D printed part that failed; and
identifying that the new 3D printed part has been installed in the unit, and based on identifying that the new 3D printed part has been installed in the unit:
program instructions to repeat the program instructions to complete an initial scan; the program instructions to complete a second scan; the program instructions to determine a baseline delta; the program instructions to perform the additional scan; and the program instructions to determine whether the additional scan is within the baseline delta steps for the new 3D printed part.

* * * * *